(12) United States Patent
Wivagg

(10) Patent No.: US 7,023,949 B2
(45) Date of Patent: Apr. 4, 2006

(54) JET PUMP ASSEMBLY REPAIR METHOD

(75) Inventor: Adrian P. Wivagg, Tolland, CT (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 392 days.

(21) Appl. No.: 10/830,452

(22) Filed: Apr. 22, 2004

(65) Prior Publication Data

US 2005/0013400 A1 Jan. 20, 2005

Related U.S. Application Data

(62) Division of application No. 10/397,626, filed on Mar. 26, 2003.

(51) Int. Cl.
*G21C 19/00* (2006.01)

(52) U.S. Cl. .............. 376/260; 376/285; 376/305; 376/372; 105/198.4; 105/404; 414/686

(58) Field of Classification Search ........... 376/260, 376/305, 407, 285, 372, 392; 105/198.4, 105/404; 414/686
See application file for complete search history.

(56) References Cited

U.S. PATENT DOCUMENTS

| 3,559,589 | A | * | 2/1971 | Williams | 105/198.4 |
|---|---|---|---|---|---|
| 3,851,595 | A | * | 12/1974 | Clasen | 105/198.4 |
| 4,208,162 | A | * | 6/1980 | Neitzel | 414/686 |
| 4,690,206 | A | * | 9/1987 | Bein | 376/285 |
| 5,130,081 | A | * | 7/1992 | Niedrach | 376/305 |
| 5,317,610 | A | * | 5/1994 | Kita et al. | 376/305 |
| 5,423,633 | A | * | 6/1995 | Verstraeten | 405/232 |
| 5,518,557 | A | * | 5/1996 | Jones et al. | 148/511 |
| 5,602,888 | A | * | 2/1997 | Hettiarachchi et al. | 376/305 |
| 5,845,764 | A | * | 12/1998 | Ommundsen | 198/677 |
| 5,978,433 | A | * | 11/1999 | Erbes et al. | 376/372 |
| 6,052,425 | A | * | 4/2000 | Erbes et al. | 376/285 |
| 6,320,923 | B1 | * | 11/2001 | Wivagg et al. | 376/407 |
| 2002/0003853 | A1 | * | 1/2002 | Ohno et al. | 376/310 |
| 2003/0041772 | A1 | * | 3/2003 | Forbes | 105/404 |

* cited by examiner

Primary Examiner—Harvey E. Behrend

(57) ABSTRACT

A BWR jet pump assembly has a wedge slidably mounted on a jet pump that is movable under the force of gravity to seat between a bracket and the jet pump in order to horizontally support the jet pump against vibrations. The wedge or the bracket is repaired in situ by: providing a spacer layer between mating surfaces of the wedge and the bracket; and then lowering the wedge until the spacer layer is between and in contact with the wedge and the bracket.

5 Claims, 4 Drawing Sheets

US 7,023,949 B2

JET PUMP ASSEMBLY REPAIR METHOD

This application is a divisional of Ser. No. 10/397,626 filed Mar. 26, 2003.

BACKGROUND OF THE INVENTION

The invention relates to a method for repairing jet pump assemblies and more particularly to a method of repairing jet pump assemblies of boiling water nuclear reactors ("BWRs") in situ.

BWRs are designed to generate steam in reactor pressure vessels ("RPVs") by heating the water surrounding uranium-containing tubes of fuel assemblies located in the RPV core regions. The RPVs have recirculation loops designed to facilitate the circulation of water in the core regions. The recirculation loops generally include large centrifugal pumps that pump water out of the RPVs and return the water to the inlets of jet pump assemblies located in annular regions in the RPVs surrounding the core regions. The jet pump assemblies are designed to entrain the surrounding water in the annular regions and then discharge the water in a manner that induces a desired flow pattern in the core regions.

The jet pump assemblies are subject to vibrations caused by hydraulic forces due to the flow of water and/or by the rotation of the centrifugal pumps. Thus, in one BWR design, the jet pump assemblies are horizontally supported against vibration within brackets by a three point suspension system. A three point system generally includes a wedge movably mounted on a vertically oriented guide rod that is attached to a jet pump assembly and extends through the space between the bracket and the jet pump. The wedge, which may weigh about seven pounds, is designed to slide downwardly under the force of gravity into the space between the bracket and the jet pump assembly and thereby urge the jet pump against the adjustment screws.

It has been found that the mating (or seating) surfaces of the wedges and/or the brackets of some commercial BWRs have worn substantially after operation over long periods of time. In some cases, the softer interior metal underlying the hardened surfaces of the wedges have worn extensively. It is believed that the wearing is caused by a fretting type of action when the hydraulic forces and/or pump vibrations induce the wedges to chatter or to rise upwardly and then fall back against the bracket. In addition, it is believed that the jet pump assemblies may move away from the adjustment screws in extreme cases.

The jet pump assemblies may be repaired by replacing the worn wedges and/or brackets. However, the jet pump assemblies and/or brackets would need to be disassembled, removed and reassembled and the old parts would needed to be permanently stored if the parts were replaced.

SUMMARY OF THE INVENTION

It is an object of the present invention to provide a method of repairing the BWR jet pump assemblies without having to disassemble the jet pump assemblies and/or the associated brackets. It is a further object to provide a method that permits the continued use of the worn wedges and/or brackets.

With these objects in view, the present invention resides in a method of repairing a BWR jet pump assembly in situ. The jet pump assembly extends vertically through a hole in a bracket attached to a riser pipe and is supported against horizontal movement by a plurality of screws extending from the bracket toward the jet pump assembly and by a wedge extending into the hole. The wedge is moveably mounted on a vertically extending guide rod fastened to the jet pump assembly. The wedge has a vertically extending inner surface designed to contact the jet pump assembly and an outer surface inclined relative to the vertically extending inner surface designed to contact the bracket. The mating surfaces the wedge the bracket are the surfaces that are susceptible to wear over time. In the repair method (which may be a proactive repair before wear is actually observed), and while the wedge remains on the guide rod fastened to the jet pump assembly, a spacer layer is provided between the outer surface of the wedge and the bracket and then the wedge is lowered through the hole in the bracket until the spacer layer is between and in contact with the wedge and the bracket.

In preferred practices, one or more spacer layers are attached to the wedges and/or to the brackets. In other preferred practices, worn portions of the wedges from previous use are displaced vertically of the brackets by the spacer layers. Advantageously, solid contact from the bracket to the jet pump assemblies can be restored.

BRIEF DESCRIPTION OF THE DRAWINGS

The invention as set forth in the claims will become more apparent from the following detailed description of a boiling water reactor ("BWR") and a preferred practice for repairing the BWR and the accompanying drawings that show, by way of example only, a worn BWR jet pump assembly that has been repaired in accordance with a preferred practice of the present invention, wherein:

DESCRIPTION OF THE PREFERRED PRACTICE

Figure 1:
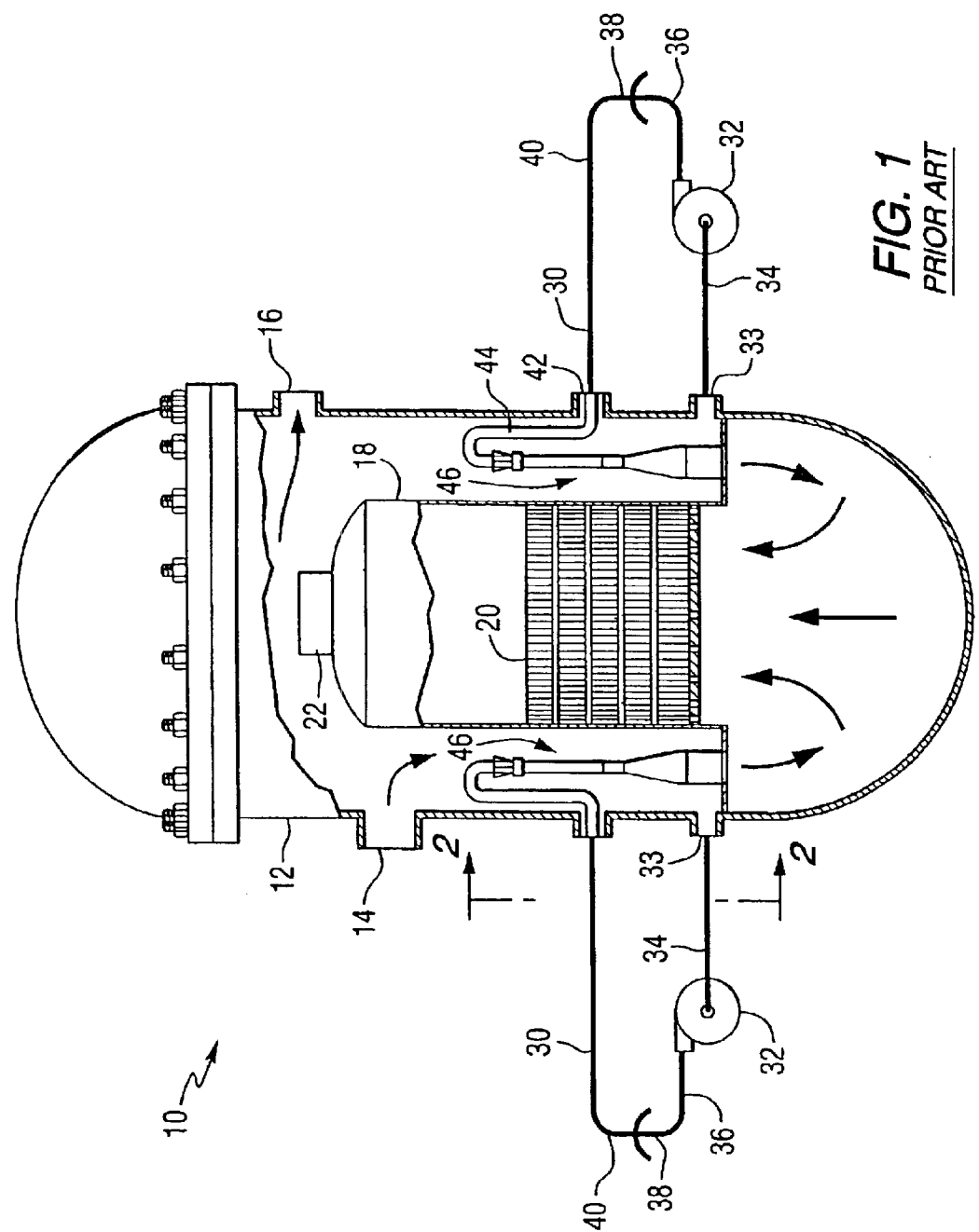
FIG. 1 is a schematic representation of a BWR characterized by a reactor pressure vessel ("RPV") having two recirculation loops.

Referring now to the drawings in detail and in particular to FIG. 1 there is generally illustrated a commercial boiling water nuclear reactor ("BWR") 10 that generates steam in a reactor pressure vessel ("RPV") 12. Commercial BWRs are designed to drive turbines (not shown), which in turn generate electrical power. The RPV 12 has a main feedwater inlet nozzle 14 for receiving condensate from a condenser (not shown) and a main steam outlet nozzle 16 for providing generated steam to a turbine. The RPV 12 supports a core shroud 18 containing a plurality of fuel assemblies 20 that generate the steam in its core region and a steam separator/drier assembly 22 located over the core shroud 18.

The RPV 12 illustrated by FIG. 1 has two recirculation loops 30 for facilitating the flow of water in its core region. Each recirculation loop 30 has a large centrifugal reactor coolant pump ("RCP") 32 connected with a recirculation water outlet nozzle 33 of the RPV 12 by pump suction piping 34 for pumping water out of the RPV 12 and pump discharge piping 36 for pumping the water back into the RPV 12. The pump discharge piping 36 generally includes a header 38 and parallel branch piping, which is illustrated by piping 40. Each of the piping branches 40 is connected by a recirculation water inlet nozzle 42 to riser piping 44, which extends to a pair of jet pump assemblies 46 operating in parallel (only one of which is illustrated by FIG. 1).

Figure 2:
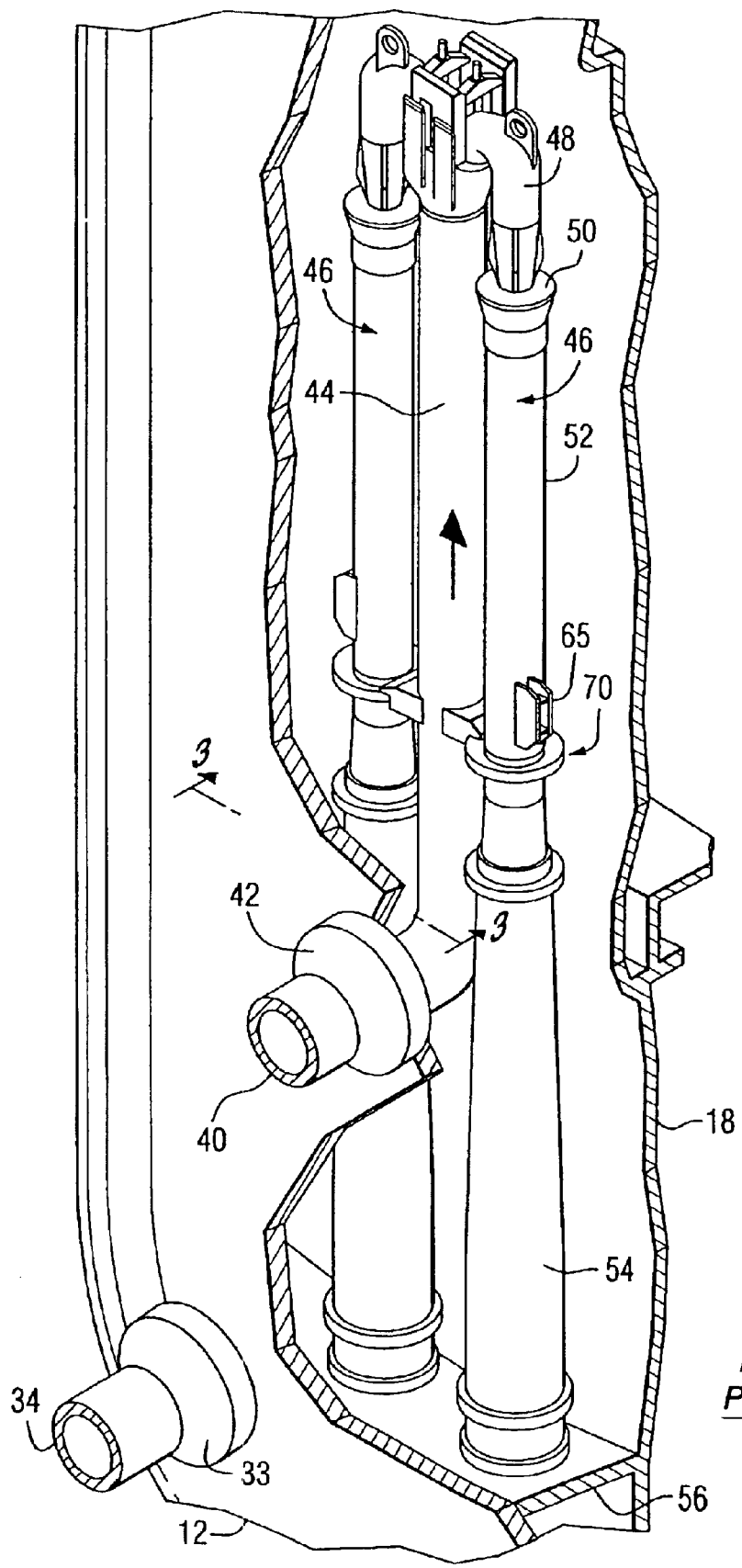
FIG. 2 is a partial perspective schematic representation of a RPV taken along Line 2—2 of FIG. 1 which has been cut-a-way to show a jet pump assembly arrangement.
Figure 3:
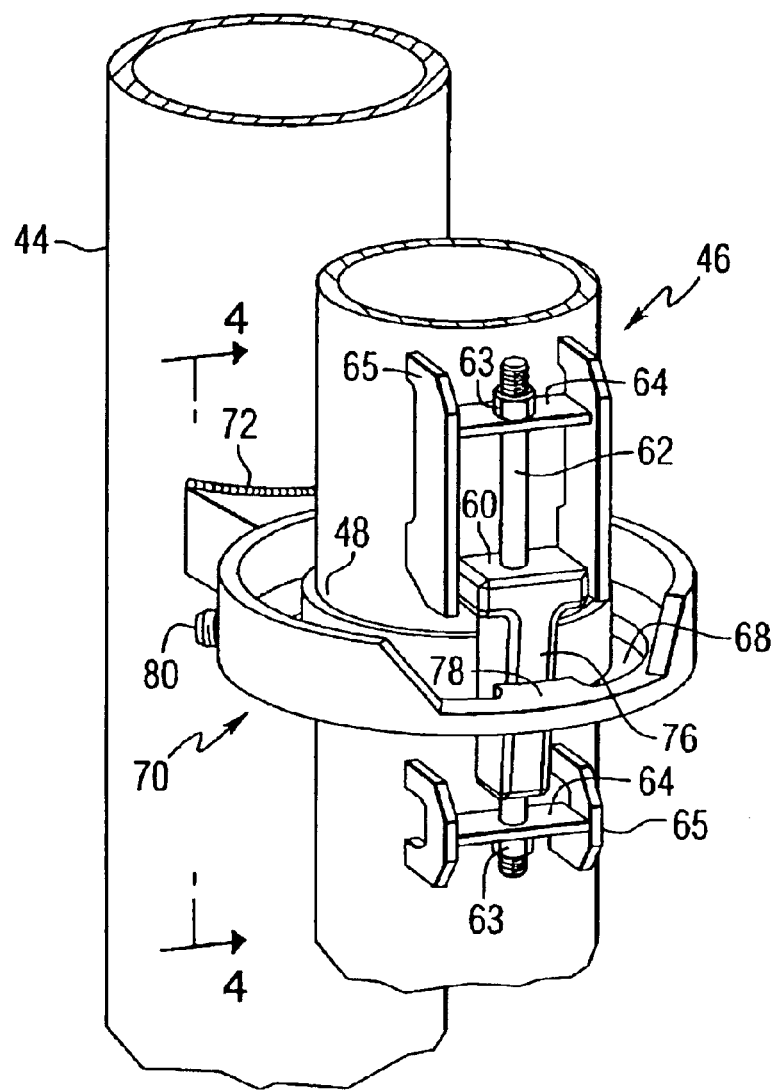
FIG. 3 is a partial perspective elevation view of a jet pump assembly horizontally supported by a bracket taken along Line 3—3 of FIG. 2.

As is best seen in FIG. 2, the riser piping 44 terminates at a manifold 48 sometimes referred to as a "ramshead". Each jet pump assembly 46 of the pair generally includes an inlet 50 adjacent the manifold 48 that is open to an annular region defined by the wall of the RPV 12 and wall of the core shroud 18 for entraining the surrounding water in the annular region, a mixing section 52 and a diffuser section 54 supported on a crossplate 56. The jet pump assembly 46 may have a boss 48 on its periphery surface as shown in FIG. 3.

Each jet pump assembly 46 has an associated wedge 60 that is movably mounted on a vertically extending guide rod 62 fastened to the jet pump assembly 46. As shown in FIG. 3, the guide rod 62 may have threaded ends engaged with nuts 63 fastened to horizontal plates 64 extending between vertical plates 65 that extend from the mixing section 52 of the jet pump assembly 46. The wedge 60 is designed to slide vertically through a hole 68 in a bracket 70, which is attached to the riser piping 44 by welds 72 or other suitable means. As shown by FIG. 3, the upper end of the guide rod 62 is above the bracket 70 and the lower end of the guide rod 62 is below the bracket 70. Also, the wedge 60 has moved downwardly on the guide rod 62 under the force of gravity to a location where a vertically extending inner surface 74 of the wedge 60 contacts the jet pump assembly 46 (and preferably the boss 48) and an outer surface 76 of the wedge 60 that is inclined relative to the inner surface 74 contacts an edge 78 of the bracket 70. The weight of the wedge 60 provides a sufficient force urging the jet pump assembly 46 against two (or more) adjustment screws 80 for horizontally supporting the jet pump assembly 46 against hydraulic forces and vibrations. The adjustment screws 80 may be fixed in place by welds (not shown). Preferably, the outer surface 76 of the wedge 60 is inclined relative to the edge surface 84 of the bracket 70. Advantageously, this three point suspension system can accommodate substantial thermal expansion differences.

Figure 4:
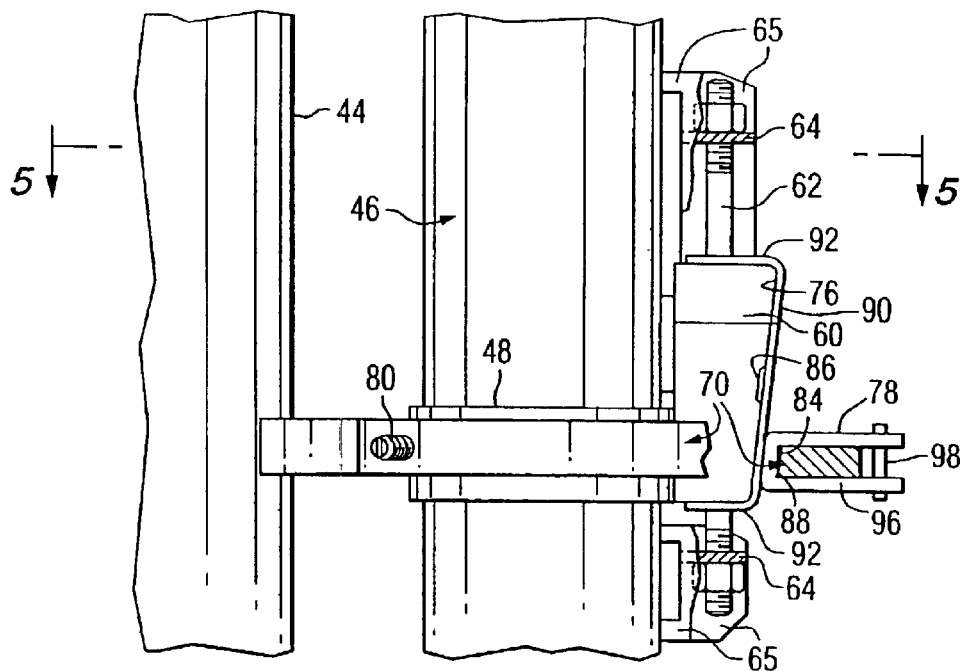
FIG. 4 is a partially fragmented elevation view of a repaired jet pump assembly taken along Line 4—4 of FIG. 3.
Figure 5:
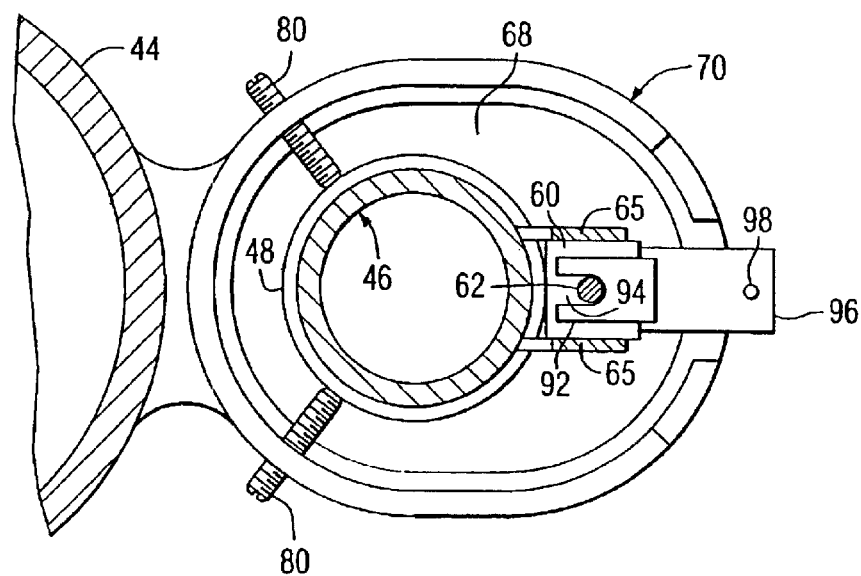
FIG. 5 is a plan view of the repaired jet pump assembly and bracket taken along Line 5—5 of FIG. 4.

FIGS. 4 and 5 illustrate a jet pump assembly 46 that was subjected to wear in the course of previous power generation operations and later repaired in accordance with a practice of the present invention. As illustrated by FIG. 4, a portion 86 of the outer surface 76 of the wedge 60 has worn and a portion 88 of the edge 78 of the bracket 70 has worn. In other cases, either one of the mating surfaces of the wedge 60 or the bracket 70 may have worn.

As shown in FIG. 4, a repaired wedge 60 has a spacer layer 90 disposed over its outer surface 76. The surface layer 90 may be configured to fit over the wedge 60 with ends 92 having recesses 94 that accept the guide rod 62. The spacer layer 90 may be tack welded to the wedge 60 at one or more convenient locations. In addition, the bracket 70 may have a second spacer layer 96 over the edge 78 if worn. Preferably, the second spacer layer 96 is retained in place by a pin 98 welded to the ends of the spacer layer 96. The spacer layers 90, 96 may be metal strips or plates fabricated of stainless steel or other suitable metal and may have hardened surfaces. Advantageously, the spacer layers 90 and 96 later may be replaced by other spacer layers if they become excessively worn. In addition, the thickness of the spacer layer(s) 90,96 is preferably sufficient to displace the worn portion 86 of the wedge 60 upwardly of the bracket 70 when the wedge 60 is seated. Also, the additional weight of the spacer layer 90 increases the total weight of the wedge 60 so that the wedge 60 tends to better resist hydraulic forces and vibrations.

In the practice of the present invention, the BWR 10 may be repaired as shown in FIGS. 4 and 5 while the jet pump assembly 46 remains in place. The wedge 60 may be raised on the guide rod 62 by any suitable remotely controlled, long handled tool (not shown). A spacer layer 90 and/or spacer layer 96 may then be fit over the worn surface 76 and/or edge 78. The spacer layer 90 and/or spacer layer 96 may then be attached to wedge 60 or bracket 70, respectively. The wedge 60 may then lowered on the guide rod 62 through the hole 68 in the bracket 70 until the spacer layer 90 and/or 96 is between and in contact with the wedge 60 and the bracket 70. The weight of the wedge 60 will then urge the jet pump assembly 46 against the adjustment pins 80.

While a present preferred embodiment of the present invention has been shown and described, it is to be understood that the invention may be otherwise variously embodied within the scope of the following claims of invention.

What is claimed is:

1. An in situ method of repairing a boiling water nuclear reactor having a jet pump assembly extending vertically through a hole in a bracket attached to a riser pipe, the jet pump assembly supported against horizontal movement by a plurality of screws extending from the bracket toward the jet pump assembly and by a wedge extending into the hole, the wedge moveably mounted on a vertically extending guide rod fastened to the jet pump assembly for urging the jet pump assembly toward the screws, the wedge having a vertically extending inner surface for contacting the jet pump assembly and an outer surface inclined relative to the vertically extending inner surface for contacting the bracket, comprising the steps of:

while the wedge remains on the guide rod fastened to the jet pump assembly in the boiling water nuclear reactor, providing a spacer layer between the outer surface of the wedge and the bracket; and then lowering the wedge on the guide rod through the hole in the bracket until the spacer layer is between and in contact with the wedge and the bracket.

2. The method of claim 1, including the step of:
attaching the spacer layer to the wedge.

3. The method of claim 1, including the step of:
attaching the spacer layer to the bracket.

4. The method of claim 1, including the steps of: providing a second spacer layer between the outer surface of the wedge and the bracket in addition to the spacer layer of claim 1; and attaching the spacer layer of claim 1 to the wedge and attaching the second spacer layer to the bracket.

5. The method of claim 1, wherein the inclined outer surface of the wedge for contacting the bracket has a worn portion displaced vertically of the bracket when the spacer member is in contact with the wedge and the bracket.

* * * * *